(No. Model.) 3 Sheets—Sheet 1.
S. H. GAGE.
CARRIAGE.
No. 560,706. Patented May 26, 1896.
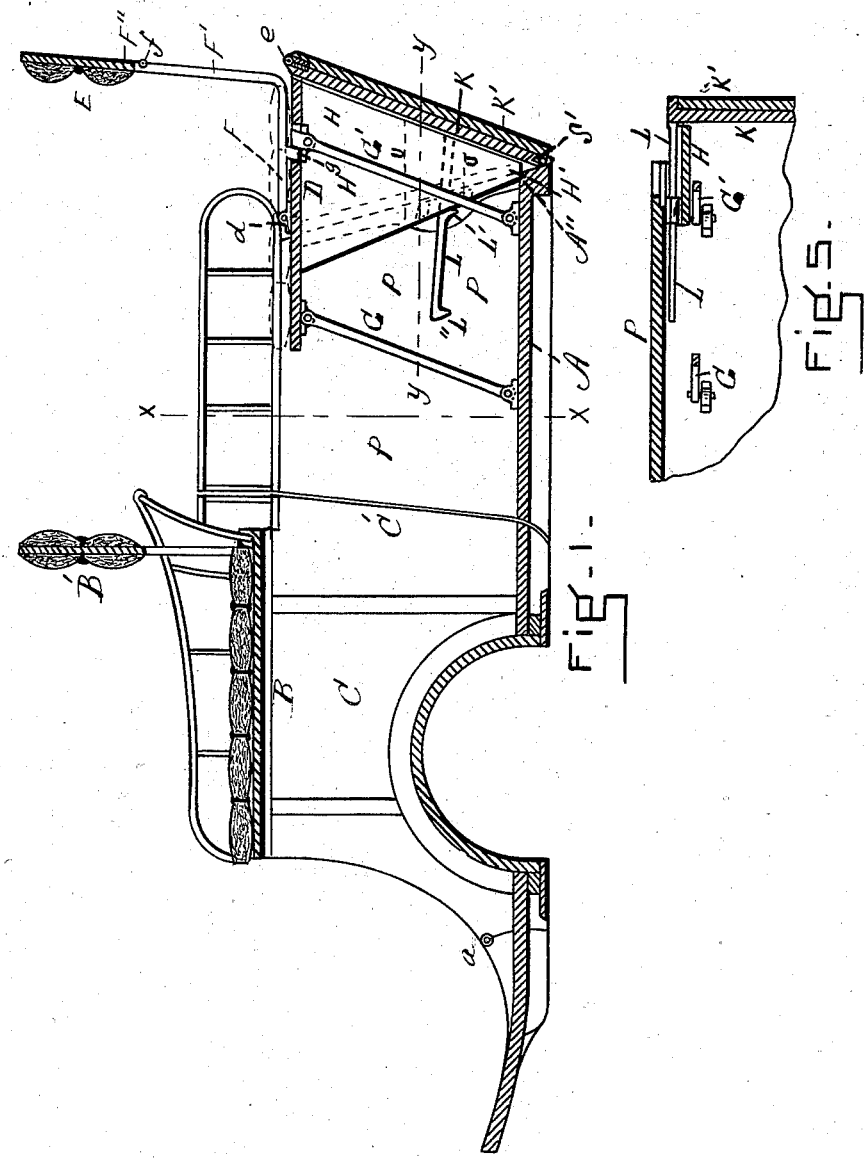
WITNESSES
A. A. Pomroy.
C. G. Graydon.
INVENTOR
Seth H. Gage,
By his Att'y
Henry Williams
ANDREW B.GRAHAM, PHOTO-LITHO. WASHINGTON, D.C.

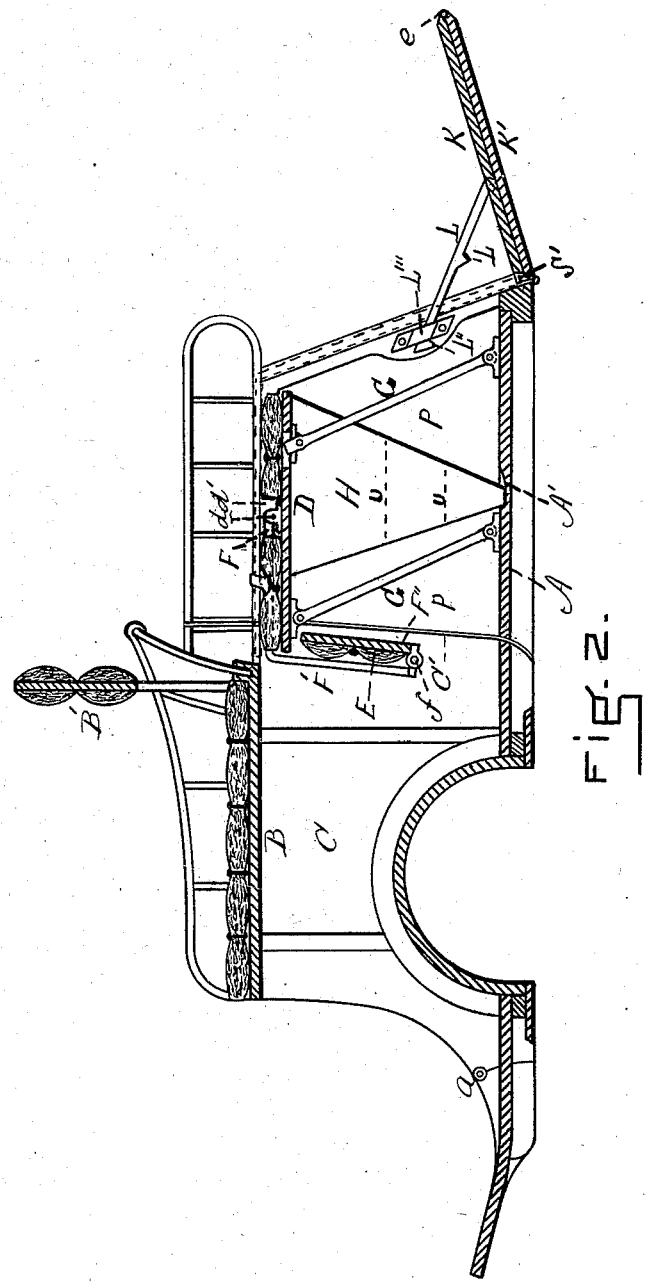

(No Model.) 3 Sheets—Sheet 3.

S. H. GAGE.
CARRIAGE.

No. 560,706. Patented May 26, 1896.

WITNESSES
A. N. Pomroy
C. G. Graydon

INVENTOR
Seth H. Gage,
By his Atty.
Henry W. Williams

UNITED STATES PATENT OFFICE.

SETH H. GAGE, OF AMESBURY, MASSACHUSETTS, ASSIGNOR TO JAMES NEAL AND CHARLES F. BOLSER, OF SAME PLACE.

CARRIAGE.

SPECIFICATION forming part of Letters Patent No. 560,706, dated May 26, 1896.

Application filed December 2, 1895. Serial No. 570,796. (No model.)

*To all whom it may concern:*

Be it known that I, SETH H. GAGE, a citizen of the United States, residing at Amesbury, in the county of Essex and State of Massachusetts, have invented new and useful Improvements in Carriages, of which the following is a specification.

This invention relates to a two-seated carriage; and it consists of the novel construction and arrangement of parts hereinafter described, whereby the rear seat may be used as a forward-facing seat; or it may be used as a rearward-facing seat, in which case the said rear seat is jumped forward, its lazy-back folded down, the lazy-back of the front seat used by the occupant of the rearward-facing rear seat, and the tail-gate dropped and used for a foot-rest; or the rear seat may be placed out of use, the jointed tail-gate folding over and serving as a deck.

The nature of the invention is fully described below and illustrated in the accompanying drawings, in which—

Figure 4:
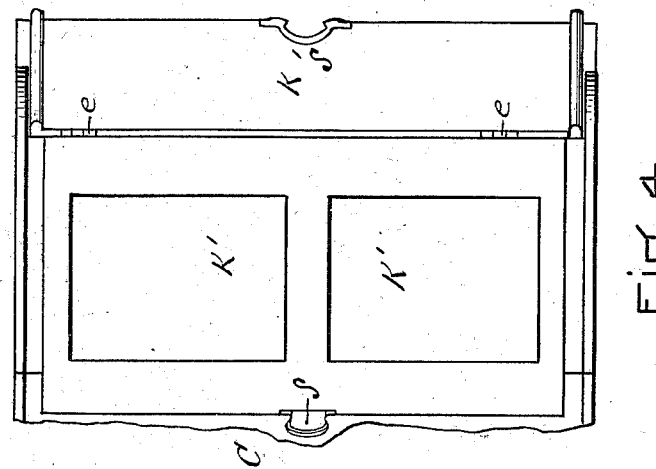
Figure 3:
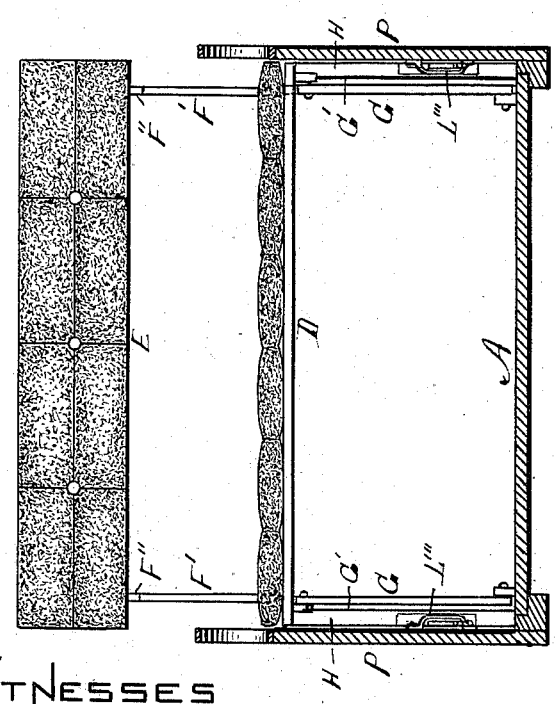

Figure 1 is a longitudinal vertical section of my improved carriage-body with the rear seat facing forward. Fig. 2 is a similar section with the parts so arranged that the occupants of the rear seat face toward the rear. Fig. 3 is a cross vertical section taken on line $x$, Fig. 1. Fig. 4 is a plan view of a portion of the carriage-body, showing the tail-gate in position to serve as a deck. Fig. 5 is a detail in horizontal section taken on line $y$, Fig. 1.

Similar letters of reference indicate corresponding parts.

A represents the floor, and B the front seat, adapted to be swung forward, together with the front panels C, (whose rear edges are at C',) by means of a hinge $a$, or in any other suitable manner.

B' is the lazy-back of the front seat.

D is the rear seat. Hinged at $d$ to the upper surface of the rear seat (suitable recesses or spaces $d'$ being formed in the cushion for the purpose) is the lazy-back E, supported by rods consisting of the portions F, the portions F', bent at right angles from the portions F, and the portions F'', which support the lazy-back proper and are hinged at $f$ to the portions F'.

The seat D is connected with the floor of the carriage-body, or to the sills thereon, by the jump-irons G G', which are pivoted at their lower ends to the floor or sills and at their upper ends to the under side of the seat. Rigidly secured to the under side of the rear seat next its opposite ends are the triangular boards or pieces H, whose lower corners or ends H' rest in the recesses or notches A', Fig. 2, when the rear seat is jumped forward and the notches A'', Fig. 1, when the rear seat is jumped rearward.

The tail-gate consists of the two portions K and K', hinged together at $e$, and the portion K being hinged at its lower edge to the carriage-body. This portion K has pivoted to its edges the supporting-irons L, provided with projections or lugs L' L'', which extend through loops or holders L''', secured to the inner surfaces of the rear portions or panels P of the sides of the carriage-body, recesses at broken lines U, Figs. 1 and 2, being made in the parts H for their accommodation.

When the parts are in the position indicated in Fig. 1, the occupants of the rear seat face forward. The tail-gate is folded upon itself and held up in the position shown by the lugs L', catching in the loops L'''. The portion K' is prevented from dropping by means of the lug or projection S, which is forced into the recess S', Fig. 4, in the portion K, and hence the two parts are locked together. The seat D is swung back until the rear edges of the triangular pieces H rest against the tail-gate, while lugs $g$ extend from the irons F into recesses in the rear seat in front of the jump-irons G', thus locking the seat in position.

To use the rear seat as a rearward-facing seat, fold the lazy-back E so that its irons are in the position shown in Fig. 2, jump the rear seat forward until the lower ends of the triangular pieces H rest in the notches A', and drop the tail-gate until the lugs L'' catch in the loops L''', all as shown in Fig. 2. The occupants use the lazy-back B' of the front seat.

When the rear seat is not to be used, swing the part S on the portion K' of the tail-gate out of engagement with the recessed part S' of the portion K, and swing the parts K K' up and forward into the position indicated in Fig. 4 and in broken lines in Fig. 2, the part K following the lines of the rear ends of the sides P and the part K′ lying over the rear seat in a horizontal position. This movement is rendered possible by beveling the adjacent edges of the two portions K K′, as shown in Figs. 1 and 2.

Having thus fully described my invention, what I claim, and desire to secure by Letters Patent, is—

1. In combination with the seat D, the lazy-back comprising the irons F F′ pivoted to the seat and bent at substantially right angles as shown and the lazy-back proper F″ pivoted to the upper ends of the upright portions F′, whereby the lazy-back can swing forward and down upon the seat with the portions F′ F″ folded against each other and hanging in a substantially vertical position, substantially as described.

2. In combination with a carriage-body and a rear seat adapted to move forward and backward therein, the tail-gate consisting of the two parts K K′, the former being hinged to the carriage-body and the upper or outer edges of said parts being hinged together, and suitable supports for holding said tail-gate in a lowered position, whereby the portion K may be raised into a position against the rear end of the carriage-body and the portion K′ laid horizontally over the rear seat and serve as a deck-panel, substantially as set forth.

3. The combination of the rear seat D, jump-irons G G′ pivotally secured at their opposite ends to the seat and the carriage-body, the triangular pieces H secured to the under side of the rear seat and extending down to and resting in recesses in the carriage-body, and the lazy-back irons F provided with lugs g adapted when the lazy-back is raised to drop into openings in the seats in front of the upper ends of the jump-irons G′, substantially as described.

4. The combination of the rear jump-seat D, the folding lazy-back F F′ F″ adapted to swing down in front of said seat, the tail-gate consisting of the two portions K K′ hinged to each other and the former hinged to the carriage-body, said portions being adapted to lock together when they are used as a tail-gate or foot-rest and to be swung apart when they are used as a tail-gate and deck-panel, and supporting-irons, as L, adapted to secure the tail-gate in a lowered or raised position, substantially as set forth.

SETH H. GAGE.

Witnesses:
JOHN H. HARVEY,
CYRUS W. ROWELL.